(12) United States Patent
Renger

(10) Patent No.: US 6,244,613 B1
(45) Date of Patent: *Jun. 12, 2001

(54) SELF-PROPELLED AGRICULTURAL MACHINE

(75) Inventor: Hermann Renger, Delbrück (DE)

(73) Assignee: Claas Selbstfahrende Erntemaschinen GmbH, Harsewinkel (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/392,861

(22) Filed: Sep. 9, 1999

(30) Foreign Application Priority Data

Sep. 12, 1998 (DE) .............................. 198 41 746

(51) Int. Cl.[7] .................................................. B62D 53/06
(52) U.S. Cl. .................... 280/440; 280/485; 280/486; 280/124.111; 280/124.169
(58) Field of Search ................................ 280/440, 485, 280/486, 489, 492, 442, 439, 438.1, 483, 494, 124.111, 124.11, 124.169; 460/23; 56/14.5, 15.4

(56) References Cited

U.S. PATENT DOCUMENTS

| | | | |
|---|---|---|---|
| 2,344,072 | * 3/1944 | Winkelmann | 280/124.111 |
| 2,543,749 | * 3/1951 | Walther | 280/440 |
| 2,712,742 | 7/1955 | Neidhart . | |
| 3,366,281 | 1/1968 | Wilder . | |
| 3,525,539 | * 8/1970 | Illar | 280/492 |
| 3,893,712 | * 7/1975 | Sallier | 280/440 |
| 4,111,273 | * 9/1978 | Blackburn et al. | 280/492 |
| 4,245,714 | * 1/1981 | Kersey | 280/492 |
| 5,356,167 | * 10/1994 | Hall et al. | 280/492 |
| 6,003,888 | * 12/1999 | Godbersoen | 280/124.169 |
| 6,070,898 | * 6/2000 | Dickie et al. | 280/124.169 |

FOREIGN PATENT DOCUMENTS

| | | | |
|---|---|---|---|
| PS 9 07 953 | 4/1954 | (DE) . | |
| 21 285 | 3/1961 | (DE) . | |
| AS 17 50 015 | 1/1972 | (DE) . | |
| 26 25 245 C2 | 8/1985 | (DE) . | |
| 25662 | * 3/1981 | (EP) | 280/492 |

* cited by examiner

Primary Examiner—Daniel G. DePumpo
(74) Attorney, Agent, or Firm—Husch & Eppenberger, LLC; Robert E. Muir; Kevin M. Kercher

(57) ABSTRACT

An articulated self-propelled agricultural machine, in particular, a forage harvester, whose group of rear axles comprise two frame parts having regions thereof arranged one above the other and the frame parts being coupled to one another by a bearing which limits the angle of rotation. One of these two frame parts is coupled to the front axle of the forage harvester by an articulated joint, while one frame part is coupled to the optionally driveable rear axle of the forage harvester via an elastic joint.

8 Claims, 5 Drawing Sheets

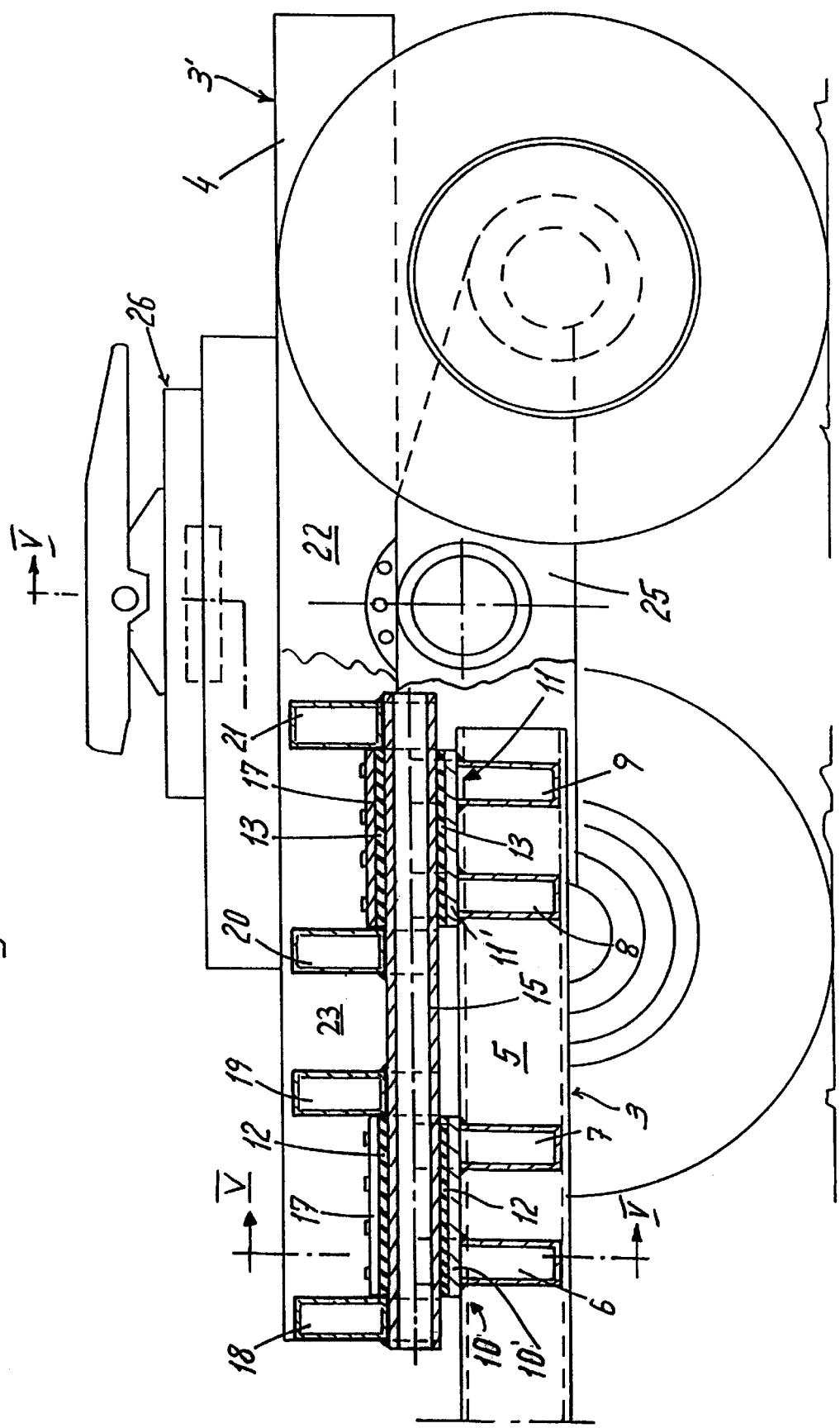

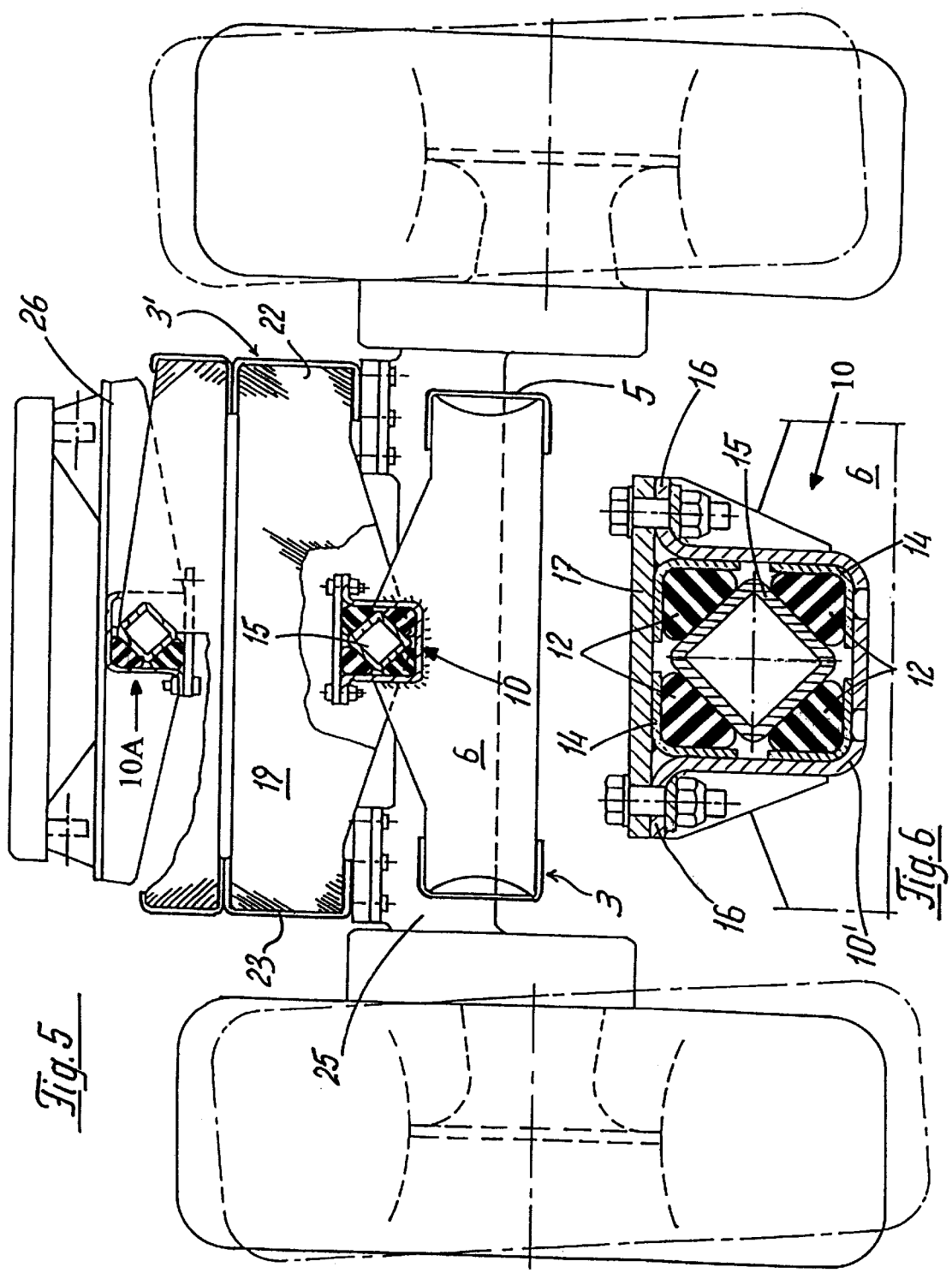

SELF-PROPELLED AGRICULTURAL MACHINE

BACKGROUND OF THE INVENTION

The invention relates to a self-propelled agricultural machine having a driven front axle and possibly also, a driveable rear axle, wherein the frames for the axles are coupled together by means of an articulated joint and the rear axle is pivotal horizontally by virtue of a thrust bearing extending along the steering axis.

A practical agricultural machine of this type is known. In this machine, the rear wheel axle is coupled in freely pivotal manner to the rear frame by means of a horizontal shaft spanning the longitudinal axis of the machine so as to adapt to rough terrain. In order to prevent the machine tipping over on such uneven terrain, especially when the steering lock is large (ca 45°),the wheel axle is additionally coupled to the rear frame by means of helical compression springs and the shock absorbers that may be associated therewith. The angle through which the wheel axle can pivot is limited by virtue of this arrangement, and adequate provision is made thereby for the necessary restoring moment. The arrangement functions satisfactorily but, against that, it is very expensive and requires a large amount of space as well as being costly and laborious to install and maintain.

SUMMARY OF THE INVENTION

An object of the present invention is to overcome one or more of the deficiencies described above.

Another object is to produce a machine of the type described which meets the demands made thereon in a satisfactory manner especially in regard to robustness and simplicity of its implementation.

Still another object of this invention is to provide a machine having a driven front axle and a rear axle in which the frames for each are coupled together with articulated joint and the rear axle frame has two parts coupled together in such a manner that the angle of rotation is limited.

In accordance with the present invention there is provided a self-propelled agricultural machine including a front portion, a rear frame and an articulated joint connecting the front portion and the rear frame; driven front axle on the front portion; a rear axle on the rear frame; the rear frame having two upper and lower parts; and a longitudinally-extending axle-box coupling the upper and lower parts of the rear frame in such a manner that the angle of rotation is limited.

Hence the objects are achieved in that the frame for the rear axle is divided and the two parts of the frame are coupled by means of an axle-box in the form of a bearing which limits the angle of rotation. A bearing or elastic joint constructed in this manner replaces the additional compression springs and shock absorbers that were previously required in agricultural machines due to its ability to limit the angle of rotation.

The rear axle frame is divided in a constructionally simple manner with certain regions of the parts thereof being arranged one above the other and wherein at least one part of the axle frame is coupled to the axle of the axle-box by means of at least one resilient element which limits the angle of rotation.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 4 is an enlarged view, partly in side elevation and partly in longitudinal section through the axle-box taken generally along line IV—IV in FIG. 3, but also showing the fifth wheel.

FIG. 5 is a cross-sectional view of the rear portion of the frame taken generally along line V—V in FIG. 4.

FIG. 6 is an enlarged cross-sectional view of the axle-box shown in FIG. 5.

DETAILED DESCRIPTION

Figure 3:
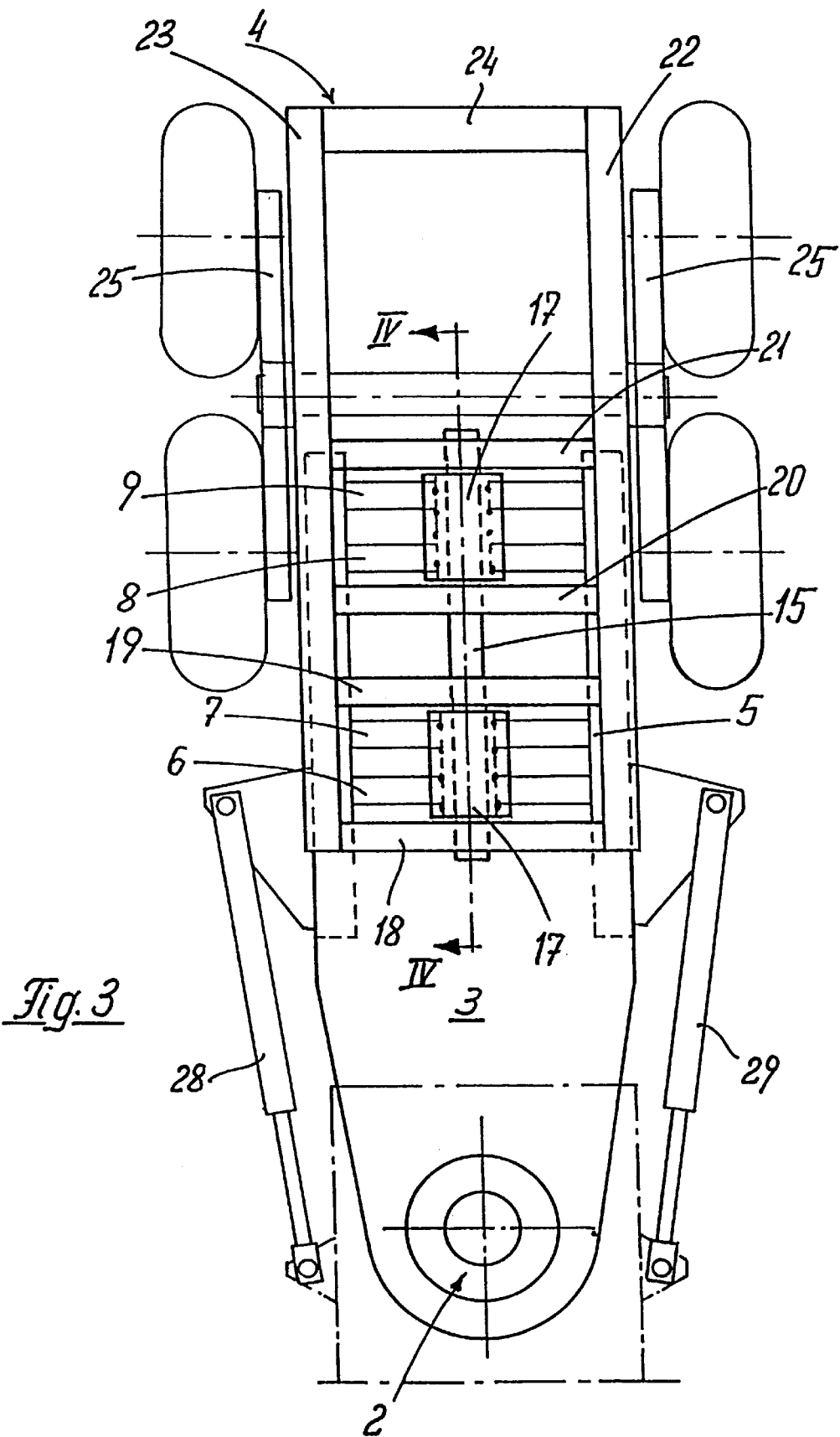
FIG. 3 is a more detailed top view of the rear portion of the frame and swing axle, but with the fifth wheel removed for better illustration of the parts.

A self-propelled forage harvester with articulated steering (i.e. which has no traditional steering axle) is denoted generally by reference numeral 1. The lower part 3 of a rear frame 4 is coupled to the forage harvester by means of an articulated joint 2, this taking the place of the traditional steering axle. As best shown in FIGS. 3 and 4, the lower part 3 of the frame conveniently comprises four transverse cross members 6–9 in addition to the longitudinal support members 5.

Referring to FIGS. 4–6, an upper part 3' is resiliently mounted on lower part 3 of rear frame 4 via longitudinally-extending elastic joints or axle boxes 10 and 11. An elastic joint of this type is disclosed in U.S. Pat. No. 2,712,742 to Hermann J. Neidhart, and the disclosure thereof is herein incorporated by reference. There are, however, significant differences. A respective channel-shaped, open-topped housing 10', 11' is rigidly welded to each pair of transverse cross members 6, 7 and 8, 9. The channel-shaped housings 10' and 11' extend in tandem along the longitudinal, central axis of the machine (i.e. the axis which passes through the articulated joint 2). Four resilient elements, which are advantageously constructed as long blocks of rubber 12 or 13 are mounted in the respective housings 10' or 11' through intermediary angle pieces 14 which are best seen in FIG. 6. The inner surfaces of the blocks 12 and 13 rest on a longitudinal interior axle 15 which has a square cross-section. Each channel-shaped housing 10', 11' has an outwardly angled collar 16 to which a cover 17 is firmly affixed as by bolts. The rubber blocks 12, 13 are pressed against the interior axle 15 with a preselected amount of prestress by means of the covers 17. The prestressed elastic joints 10, 11 provide a resilient mounting of upper part 3' on lower part 3 of rear frame 4 so that the upper part 3' may move slightly up or down relative to the longitudinal axis of the frame 4.

Figure 1:
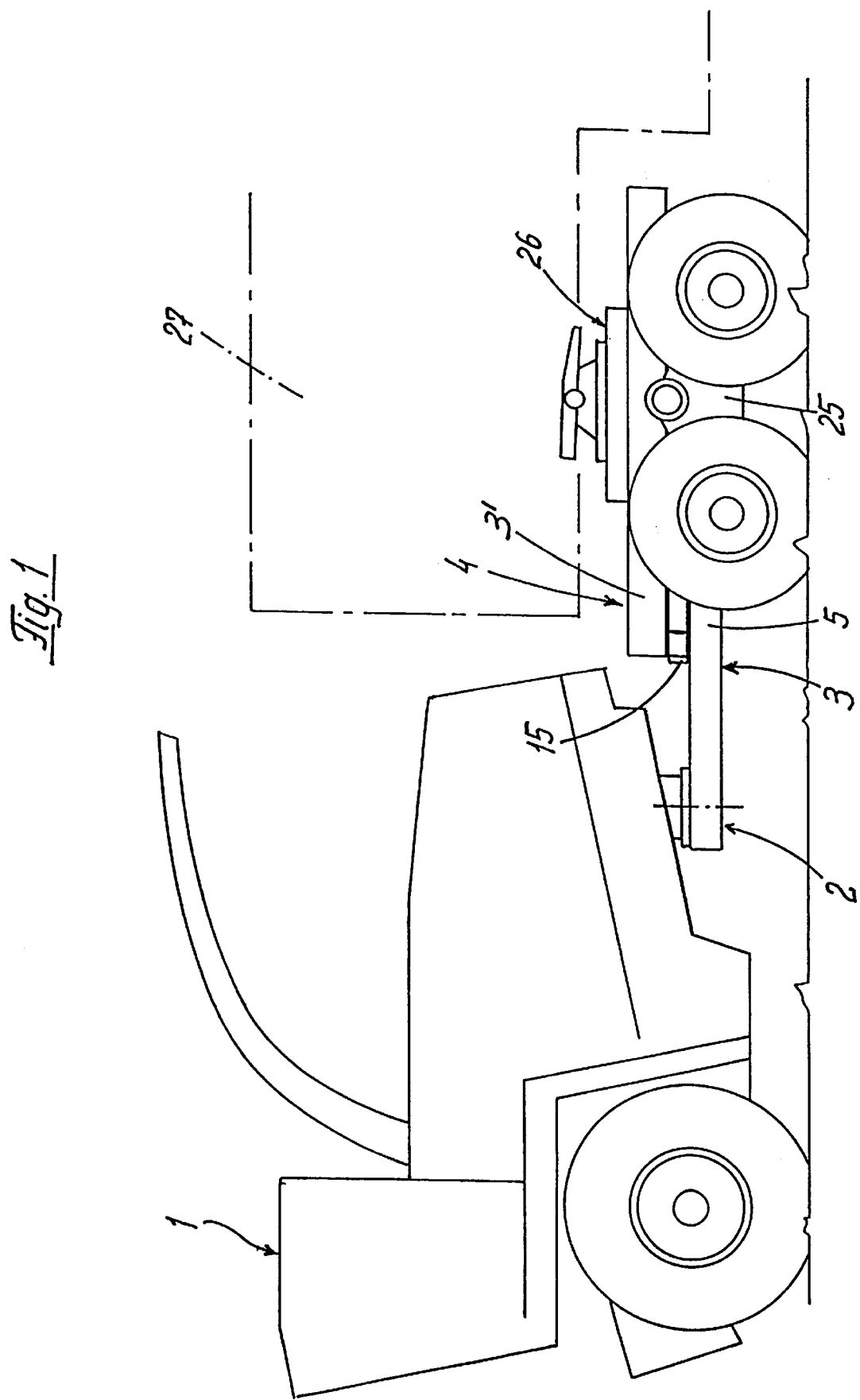
FIG. 1 is a side elevation of an agricultural machine, such as a forage harvester, having a trailer hitched thereto.

As best shown in FIG. 4, the interior axle 15 is welded centrally to four transverse cross members 18 to 21. Cross members 18–21, together with the side pieces 22 and 23 and a rear terminating transverse cross member 24 (see FIG. 3), form an upper frame part 3'. This upper part 3' of the frame accommodates a double pivot axle 25. A fifth wheel 26 for coupling a trailer 27 (see FIG. 1) is also mounted on upper part 3', for example, via a separate elastic joint 10A, as shown in FIG. 5.

Figure 2:
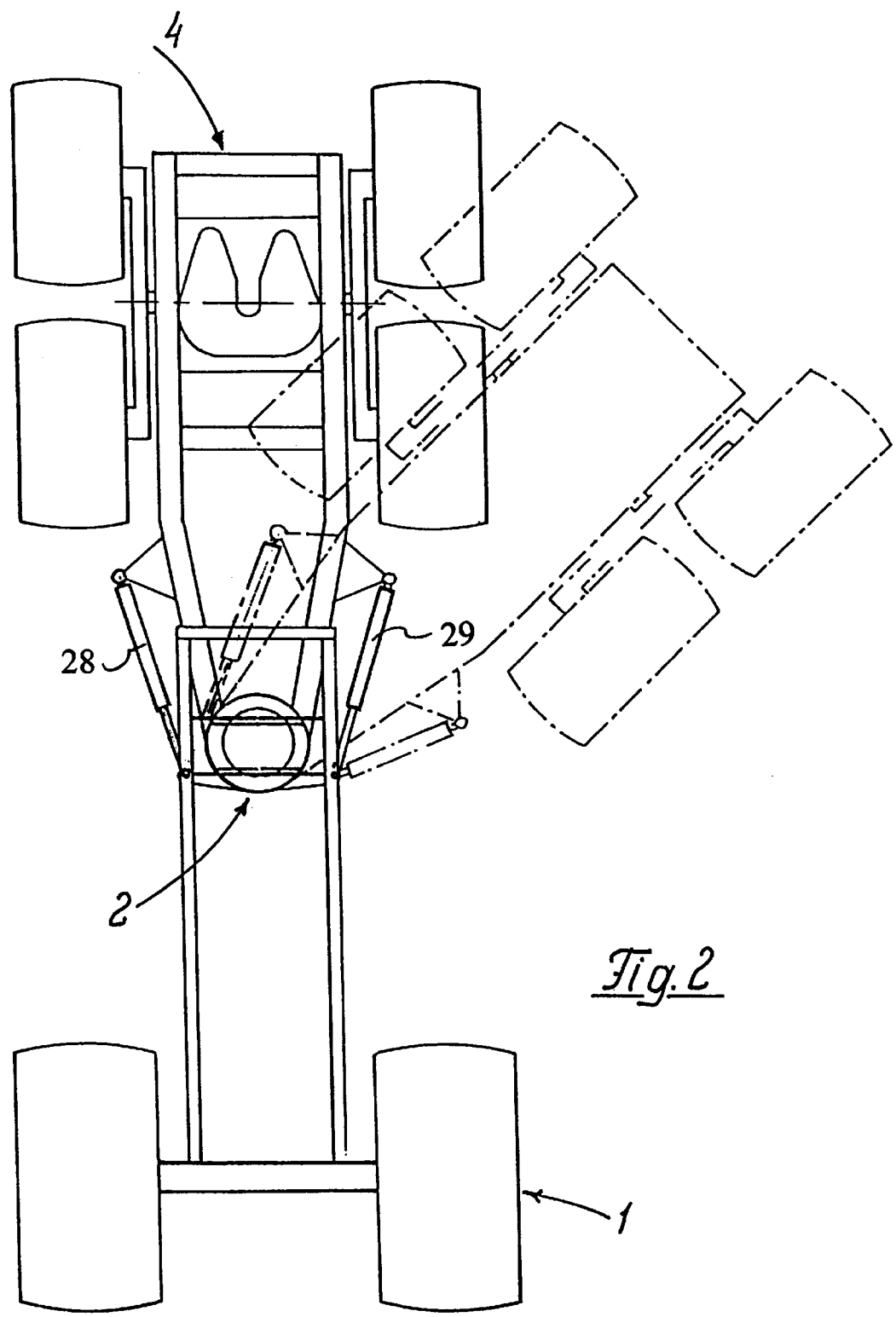
FIG. 2 is a top view of an articulated frame for the forage harvester illustrated in FIG. 1.

Advantageously, the double pivot axle 25 may be driven. The steering lock or angle for the forage harvester 1 relative to the rear frame 4 is produced by means of two hydraulic piston-cylinder units 28 and 29. As shown in phantom lines in FIG. 2, hydraulic units 28 and 29 pivot the rear frame 4 relative to the forage harvester 1 via pivot axis 2 in known manner.

While a preferred embodiment of the invention has herein been illustrated and described, this has been done by way of illustration and not limitation, and the invention should not be limited except as required by the scope of the accompanying claims.

I claim:

1. A self-propelled agricultural machine, having a longitudinal axis, including a front portion, a rear frame; a driven front axle on the front portion; a rear axle on the rear frame; the rear frame having an upper part and a lower part; and a fifth wheel for coupling that pivots along a transverse axis and is mounted on the upper part of the rear frame and a longitudinally-extending axle-box having a plurality of resilient members surrounding an interior axle in a housing wherein the longitudinally-extending axle-box resiliently connects the upper part and the lower part of the rear frame so that an angle of rotation along the longitudinal axis for the upper part of the rear frame in relation to the lower part of the rear frame is limited.

2. A self-propelled agricultural machine in accordance with claim 1, wherein the interior axle of the at least one longitudinally-extending axle-box is rigidly connected to at least one transverse cross member of the upper part of the rear frame and is attached to at least one transverse cross member of the lower part of the rear frame by the housing.

3. A self-propelled agricultural machine in accordance with claim 2, wherein the interior axle has a square cross-section and upon each face of the interior axle rests a at least one of the plurality of resilient members which is pressed against the respective outer surface of the interior axle by means of the housing.

4. A self-propelled agricultural machine in accordance with claim 1, wherein the housing is in the form of a channel having a U-shaped cross-section having at least one arm, each arm forming an outwardly directed collar to which a cover for closing the housing may be bolted.

5. A self-propelled agricultural machine in accordance with claim 2, wherein the housing is welded to the at least one transverse cross member.

6. A self-propelled agricultural machine in accordance with claim 2, each piece of said plurality of resilient members is held in the housing through at least one angle piece.

7. A self-propelled agricultural machine in accordance with claim 1, wherein the interior axle of the at least one longitudinally-extending axle-box is rigidly connected to at least one transverse cross member of the lower part of the rear frame and is attached to at least one transverse cross member of the upper part of the rear frame by the housing.

8. A self-propelled agricultural machine, having a longitudinal axis, including a front portion, a rear frame; a driven front axle on the front portion; a rear axle on the rear frame; the rear frame having an upper part and a lower part; and a fifth wheel for coupling that pivots along a transverse axis and is mounted on the upper part and a first longitudinally-extending axle-box having a plurality of resilient members surrounding an interior axle in a housing wherein the first longitudinally-extending axle-box resiliently operatively connects the fifth wheel and the upper part of the rear frame so that an angle of rotation along the longitudinal axis for the fifth wheel in relation to the upper part of the rear frame is limited and a second longitudinally-extending axle-box having a plurality of resilient members surrounding an interior axle in a housing wherein the second longitudinally-extending axle-box resiliently connects the upper part of the rear frame and the lower part of the rear frame so that an angle of rotation along the longitudinal axis for the upper part of the rear frame in relation to the lower part of the rear frame is limited.

* * * * *